US012607039B2

(12) United States Patent
Huang et al.

(10) Patent No.: US 12,607,039 B2
(45) Date of Patent: Apr. 21, 2026

(54) REKEYABLE LOCK

(71) Applicant: TAIWAN FU HSING INDUSTRIAL CO., LTD., Kaohsiung City (TW)

(72) Inventors: Chao-Ming Huang, Kaohsiung City (TW); Chi-Ming Chen, Kaohsiung City (TW)

(73) Assignee: TAIWAN FU HSING INDUSTRIAL CO., LTD., Kaohsiung City (TW)

( * ) Notice: Subject to any disclaimer, the term of this patent is extended or adjusted under 35 U.S.C. 154(b) by 98 days.

(21) Appl. No.: 18/430,250

(22) Filed: Feb. 1, 2024

(65) Prior Publication Data

US 2024/0271461 A1 Aug. 15, 2024

(30) Foreign Application Priority Data

Feb. 10, 2023 (TW) ................................ 112104768
Nov. 24, 2023 (TW) ................................ 112145634

(51) Int. Cl.
*E05B 27/00* (2006.01)

(52) U.S. Cl.
CPC ........ *E05B 27/005* (2013.01); *E05B 27/0014* (2013.01)

(58) Field of Classification Search
CPC ............... E05B 27/005; E05B 27/0053; E05B 27/0014; E05B 29/004; E05B 35/083
See application file for complete search history.

(56) References Cited

U.S. PATENT DOCUMENTS

| | | | | |
|---|---|---|---|---|
| 2,266,163 | A | 12/1941 | Ching | |
| 2,422,600 | A | 6/1947 | Swanson | |
| 2,807,158 | A | 9/1957 | Best | |
| 2,977,786 | A * | 4/1961 | Marron | E05B 9/04 70/379 R |
| 3,099,151 | A | 7/1963 | Schlage | |
| 3,175,379 | A | 3/1965 | Russell et al. | |
| 3,206,958 | A | 9/1965 | Best | |
| 3,338,078 | A | 8/1967 | Eberitch et al. | |
| 3,431,757 | A | 3/1969 | Hideo | |
| 4,168,617 | A | 9/1979 | Prunbauer | |

(Continued)

FOREIGN PATENT DOCUMENTS

| | | | |
|---|---|---|---|
| AU | 2024200518 | A1 | 8/2024 |
| CA | 1146375 | A | 5/1983 |

(Continued)

*Primary Examiner* — Christine M Mills

(74) *Attorney, Agent, or Firm* — Muncy, Geissler, Olds & Lowe, P.C.

(57) ABSTRACT

A rekeyable lock includes a lock casing formed with a lock cylinder hole, a pin replacing hole and a plurality of first pin holes; a lock cylinder rotatably arranged in the lock cylinder hole and formed with a plurality of second pin holes; a pin set including a plurality of first pins respectively accommodated in the first pin holes, and a plurality of second pins respectively accommodated in the second pin holes; and a pin cover arranged in the pin replacing hole and including a cover body formed with a groove, and a sliding block arranged in the groove and slidable relative to the cover body. When the sliding block is located at a predetermined position, the sliding block and the cover body are configured to respectively abut against an inner wall of the lock casing to fix the pin cover in the pin replacing hole.

10 Claims, 7 Drawing Sheets

(56) References Cited

U.S. PATENT DOCUMENTS

| | | | | |
|---|---|---|---|---|
| 4,368,629 | A | 1/1983 | Prunbauer | |
| 4,472,953 | A | 9/1984 | Gater | |
| 4,672,827 | A | 6/1987 | Craig | |
| 4,836,002 | A | 6/1989 | Monahan | |
| 4,850,210 | A * | 7/1989 | Adler | E05B 9/086 70/383 |
| 4,912,953 | A | 4/1990 | Wobig | |
| 5,176,015 | A | 1/1993 | Sussina | |
| 5,799,519 | A | 9/1998 | Hsiao | |
| 6,314,774 | B1 | 11/2001 | Andersson | |
| 6,532,782 | B2 * | 3/2003 | Chiu | E05B 9/086 70/369 |
| 6,851,292 | B2 | 2/2005 | Krühn | |
| 7,159,424 | B2 | 1/2007 | Widén | |
| 7,290,418 | B2 | 11/2007 | Herdman | |
| 7,448,239 | B1 * | 11/2008 | Huang | E05B 27/005 70/495 |
| 7,448,240 | B1 * | 11/2008 | Huang | E05B 29/004 70/495 |
| 7,533,550 | B2 | 5/2009 | Herdman | |
| 7,552,608 | B2 * | 6/2009 | Field | E05B 19/0029 70/420 |
| 7,802,455 | B2 | 9/2010 | Herdman | |
| 8,117,876 | B2 * | 2/2012 | Mathachan | E05B 27/005 70/495 |
| 8,347,675 | B2 | 1/2013 | Seliber | |
| 8,707,746 | B1 * | 4/2014 | Liu | E05B 27/005 70/385 |
| 8,820,127 | B2 | 9/2014 | Avganim | |
| 9,260,884 | B2 | 2/2016 | Li et al. | |
| 9,506,272 | B2 | 11/2016 | Gerlings et al. | |
| 10,273,716 | B2 | 4/2019 | Huang | |
| 10,808,421 | B2 | 10/2020 | Clifford et al. | |
| 11,613,910 | B2 | 3/2023 | Clifford | |
| 2004/0172994 | A1 * | 9/2004 | Chong | E05B 27/005 70/493 |
| 2004/0221630 | A1 * | 11/2004 | Herdman | E05B 27/005 70/382 |
| 2007/0017264 | A1 * | 1/2007 | Seliber | E05B 27/0053 70/340 |
| 2007/0193317 | A1 * | 8/2007 | Herdman | E05B 27/0057 70/383 |
| 2008/0047310 | A1 | 2/2008 | Yu | |
| 2008/0223097 | A1 * | 9/2008 | Field | E05B 27/0032 70/494 |
| 2008/0276673 | A1 * | 11/2008 | Huang | E05B 31/00 70/490 |
| 2009/0277234 | A1 * | 11/2009 | Huang | E05B 29/004 70/357 |
| 2009/0277236 | A1 * | 11/2009 | Huang | E05B 29/004 70/385 |
| 2009/0277240 | A1 * | 11/2009 | Huang | E05B 29/004 70/493 |
| 2010/0018267 | A1 * | 1/2010 | Huang | E05B 29/004 70/449 |
| 2010/0300161 | A1 | 12/2010 | Lin | |
| 2011/0154872 | A1 * | 6/2011 | Huang | E05B 27/005 70/384 |
| 2011/0226027 | A1 * | 9/2011 | Huang | E05B 29/004 70/374 |
| 2013/0086958 | A1 * | 4/2013 | Emory | E05B 29/0046 70/357 |
| 2014/0020440 | A1 * | 1/2014 | Herdman | E05B 27/005 70/375 |
| 2014/0069156 | A1 * | 3/2014 | Romero | E05B 27/005 70/385 |
| 2014/0290317 | A1 | 10/2014 | Li et al. | |
| 2014/0331726 | A1 * | 11/2014 | Herdman | E05B 27/005 70/490 |
| 2016/0376814 | A1 * | 12/2016 | Walls | E05B 27/0057 70/352 |
| 2017/0152678 | A1 | 6/2017 | Clifford | |
| 2019/0024410 | A1 | 1/2019 | Huang | |
| 2020/0024865 | A1 | 1/2020 | Clifford et al. | |
| 2024/0229507 | A1 * | 7/2024 | Farag | E05B 35/008 |
| 2024/0271462 | A1 * | 8/2024 | Huang | E05B 27/0053 |
| 2024/0271463 | A1 | 8/2024 | Huang et al. | |
| 2024/0344356 | A1 * | 10/2024 | Huang | E05B 27/0017 |

FOREIGN PATENT DOCUMENTS

| | | | |
|---|---|---|---|
| CA | 2184655 | A1 | 3/1997 |
| CN | 201401055 | Y | 2/2010 |
| CN | 103015805 | A | 4/2013 |
| CN | 102124176 | B | 9/2013 |
| CN | 203223073 | U | 10/2013 |
| CN | 203531524 | U | 4/2014 |
| EP | 0611862 | A2 | 8/1994 |
| EP | 2458116 | B1 | 12/2015 |
| EP | 2440726 | B1 | 1/2018 |
| TW | 444092 | B | 7/2001 |
| TW | 200811350 | A | 3/2008 |
| TW | I379935 | | 12/2012 |
| TW | M581626 | U | 8/2019 |
| TW | M629828 | U | 7/2022 |
| TW | M643124 | U | 6/2023 |
| WO | WO-01/34927 | A1 | 5/2001 |
| WO | WO2011009281 | A1 | 1/2011 |
| WO | WO-2012/021384 | A1 | 2/2012 |

* cited by examiner

REKEYABLE LOCK

BACKGROUND OF THE INVENTION

1. Field of the Invention

The present invention relates to a lock, and more particularly, to a rekeyable lock.

2. Description of the Prior Art

Generally, a lock comprises a plurality of pins in a lock cylinder to work with a key in order to perform locking and unlocking operations. For example, when heights of teeth of the key corresponds to variances in length of the pins in the lock cylinder, the key can rotate the lock cylinder to perform locking and unlocking operations; when heights of teeth of the key does not correspond to variances in length of the pins in the lock cylinder, the key cannot rotate the lock cylinder to perform locking and unlocking operations. For requirements of replacing the key, the pins in the lock cylinder of the lock of the prior art must be replaced in order to allow variances in length of new pins in the lock cylinder to correspond to heights of teeth of a new key. In order to prevent the pins in the lock cylinder from falling out when the lock cylinder is rotated by the key, the lock of the prior art comprises a pin plug to block the pins. However, the pin plug of the lock of the prior art is easy to be pushed out by the pins, such that the pins in the lock cylinder may fall out, so as to cause the lock to fail to function properly.

SUMMARY OF THE INVENTION

A rekeyable lock of the present invention comprises a lock casing, a lock cylinder, a pin set and a pin cover. The lock casing is formed with a lock cylinder hole, a pin replacing hole and a plurality of first pin holes. The lock cylinder is rotatably arranged in the lock cylinder hole, and the lock cylinder is formed with a plurality of second pin holes. The pin set comprises a plurality of first pins respectively accommodated in the first pin holes, and a plurality of second pins respectively accommodated in the second pin holes. The pin cover is arranged in the pin replacing hole, and comprises a cover body formed with a groove, and a sliding block arranged in the groove and slidable relative to the cover body between a first predetermined position and a second predetermined position. When the sliding block is located at the second predetermined position, the sliding block and the cover body are configured to respectively abut against an inner wall of the lock casing to fix the pin cover in the pin replacing hole.

In an embodiment of the present invention, when the sliding block is located at the first predetermined position, the sliding block does not abut against the inner wall of the lock casing to allow the pin cover to move away from the pin replacing hole.

In an embodiment of the present invention, the sliding block is formed with a first positioning structure, and the inner wall of the lock casing is formed with a second positioning structure; wherein when the sliding block is located at the first predetermined position, the first positioning structure is engaged with the second positioning structure to prevent the sliding block from sliding relative to the cover body.

In an embodiment of the present invention, the sliding block is further formed with a third positioning structure, and the cover body is formed with a fourth positioning structure; wherein when the sliding block is located at the first predetermined position, the third positioning structure is engaged with the fourth positioning structure to prevent the sliding block from sliding relative to the cover body.

In an embodiment of the present invention, the sliding block comprises a main body and a protrusion part protruded relative to the main body; wherein a top surface of the protrusion part, a top surface of the cover body and an outer surface of the lock casing are flush.

In an embodiment of the present invention, when the lock cylinder is located at a first rotation position relative to the lock casing, the plurality of second pin holes are communicated with the plurality of first pin holes respectively; wherein when the lock cylinder is located at a second rotation position relative to the lock casing, the plurality of second pin holes are communicated with the pin replacing hole.

In an embodiment of the present invention, the cover body comprises a covering part configured to cover the pin replacing hole and formed with the groove, and an extension part extended from the covering part and configured to abut against an edge of the lock casing adjacent to the pin replacing hole.

In an embodiment of the present invention, the cover body is made of a plastic material, and the sliding block is made of a metal material.

In an embodiment of the present invention, the lock cylinder is further formed with a key hole communicated with the plurality of second pin holes; wherein the lock cylinder is applicable to a first key having a first cross section and a second key having a second cross section different from the first cross section, and the key hole is configured to selectively receive the first key or the second key.

In an embodiment of the present invention, an outer contour of the keyhole is greater than or equal to an outer contour after superimposing the first cross section and the second cross section.

In contrast to the prior art, the pin cover of the rekeyable lock of the present invention can be stably fixed in the pin replacing hole in order to prevent the second pins from falling out. Moreover, the pin cover of the rekeyable lock of the present invention can be easily removed from the pin replacing hole in order to change the second pins. In addition, the lock cylinder of the rekeyable lock of the present invention is applicable to keys with different heights of teeth and keys with different cross sections, so as to increase flexibility of the rekeyable lock of the present invention in use and design.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
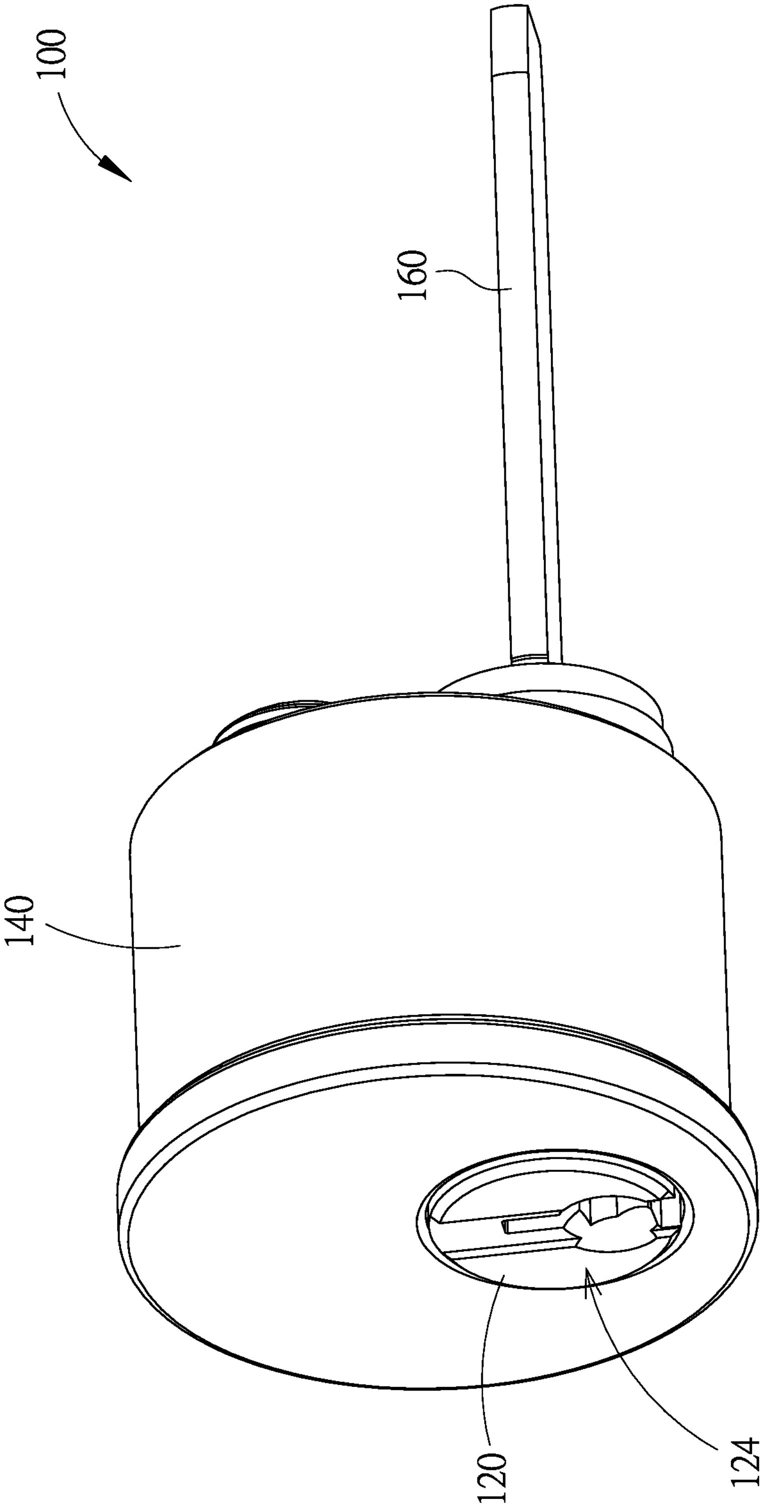
FIG. 1 is a diagram showing a rekeyable lock of the present invention.
Figure 2:
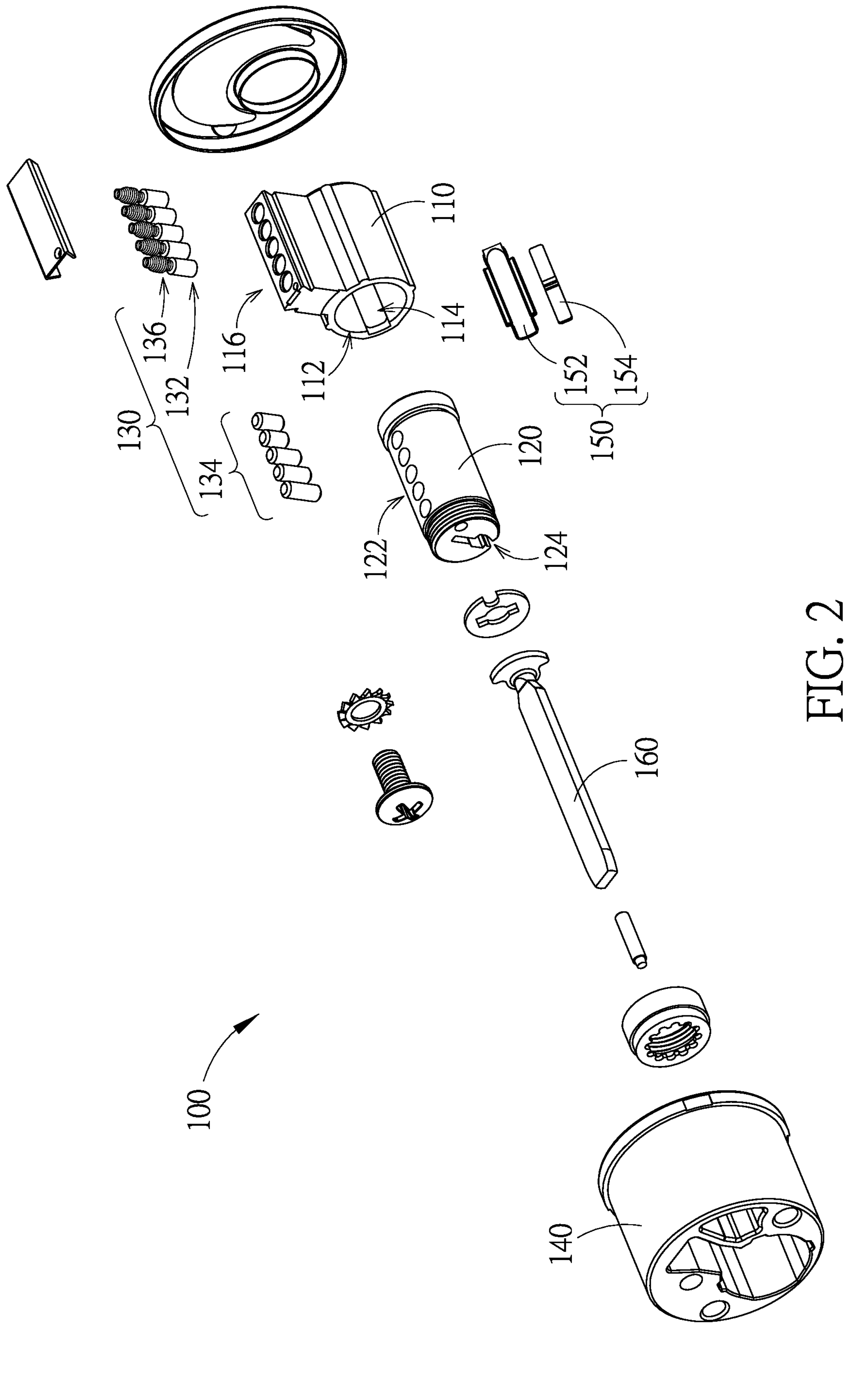
FIG. 2 is an exploded view of the rekeyable lock of the present invention.

Please refer to FIG. 1 and FIG. 2. FIG. 1 is a diagram showing a rekeyable lock of the present invention, and FIG. 2 is an exploded view of the rekeyable lock of the present invention. As shown in figures, the rekeyable lock 100 of the present invention comprises a lock casing 110, a lock cylinder 120, a pin set 130, an outer casing 140 and a pin cover 150. The lock casing 110 is formed with a lock cylinder hole 112, a pin replacing hole 114 and a plurality of first pin holes 116. The lock cylinder hole 112 is communicated with the pin replacing hole 114 and the first pin holes 116. The lock cylinder 120 is rotatably arranged in the lock cylinder hole 112. The lock cylinder 120 is formed with a plurality of second pin holes 122 corresponding to the plurality of first pin holes 116 respectively. The lock cylinder 120 is further formed with a key hole 124 communicated with the plurality of second pin holes 122. The key hole allows a key to insert therein.

The pin set 130 comprises a plurality of first pins 132, a plurality of second pins 134 and a plurality of springs 136. The plurality of first pins 132 are respectively accommodated in the first pin holes 116. Lengths of the first pins 132 are identical. The plurality of springs 136 are respectively accommodated in the first pin holes 116 and configured to push the plurality of first pins 132 toward the lock cylinder 120. The plurality of second pins 134 are respectively accommodated in the second pin holes 122. Lengths of the second pins 134 can be different to correspond to heights of teeth of a key.

The outer casing 140 is formed with an accommodation space inside for accommodating the lock casing 110. The pin cover 150 is arranged in the pin replacing hole 114 and configured to cover and close the pin replacing hole 114.

Figure 3:
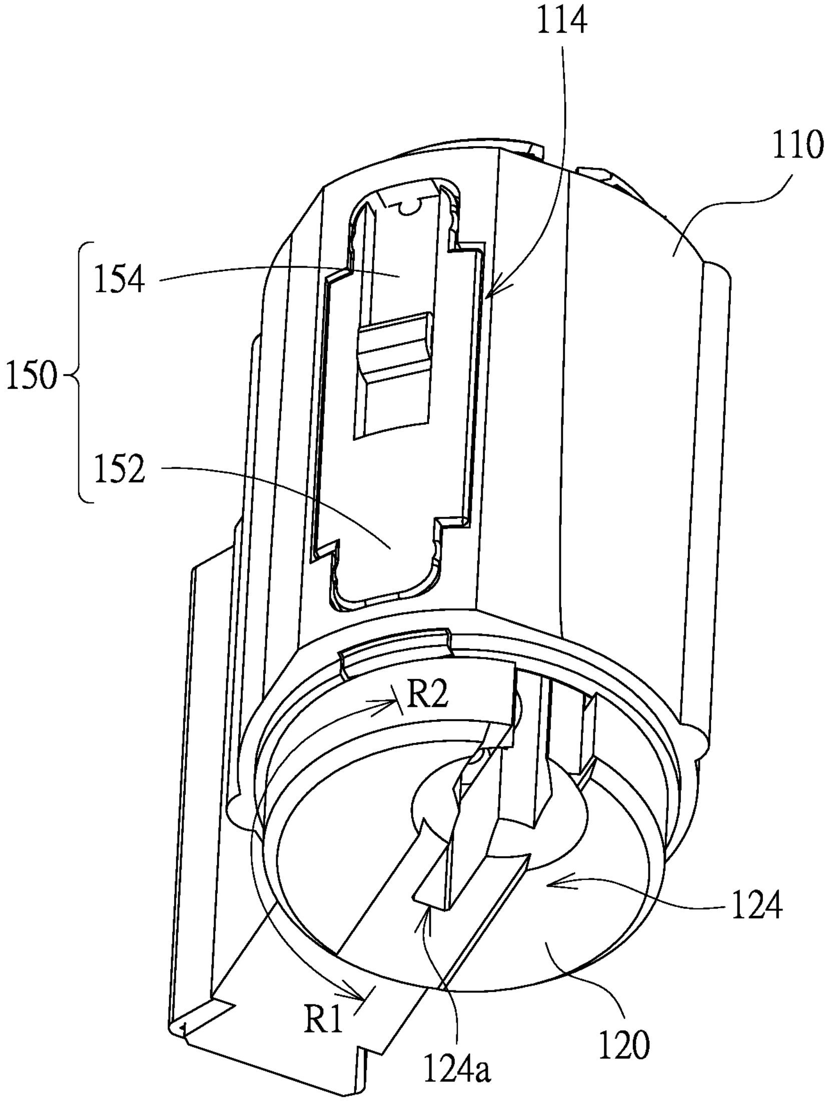
FIG. 3 is a diagram showing a lock casing, a lock cylinder and a pin cover of the present invention.
Figure 4:
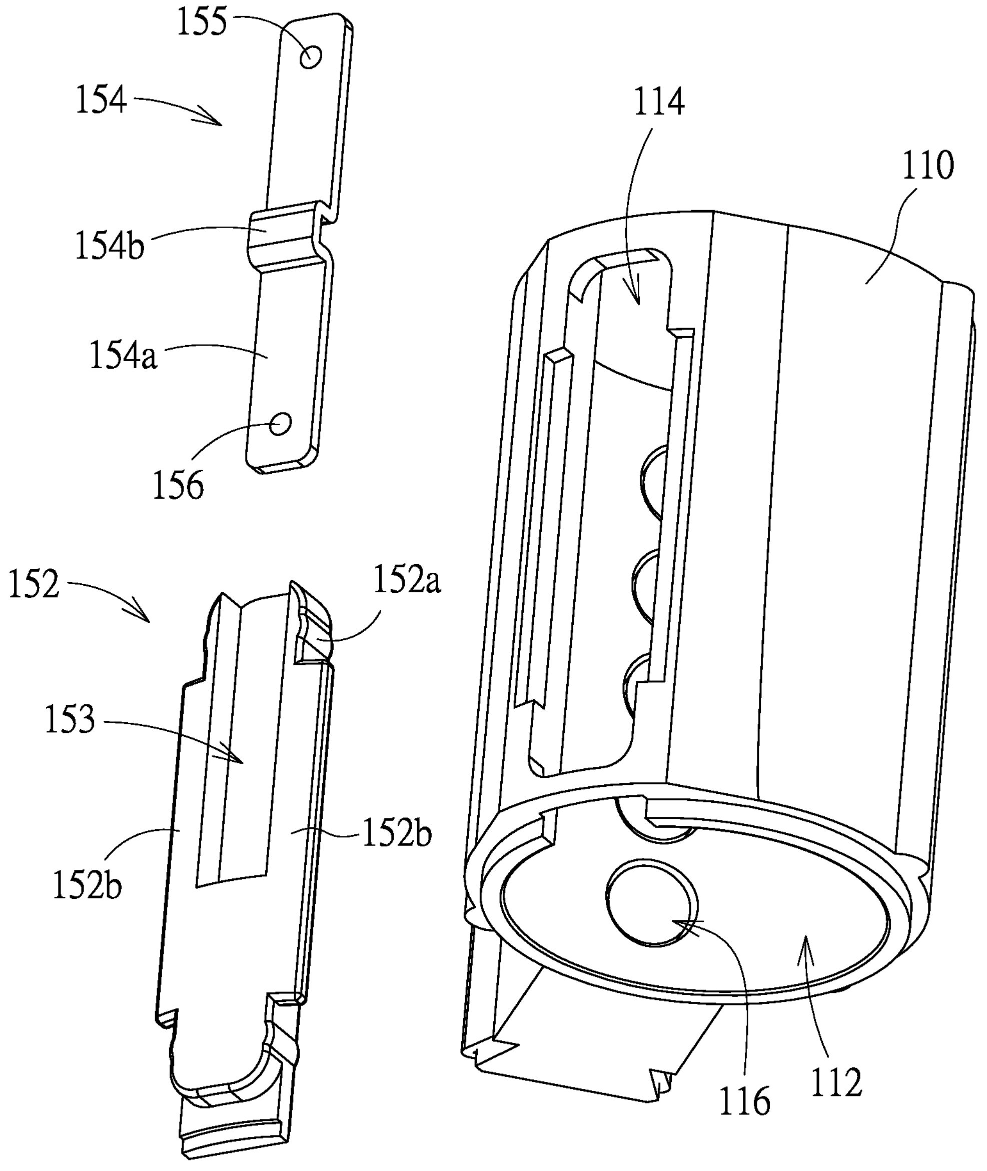
FIG. 4 is an exploded view of the lock casing and the pin cover of the present invention.
Figure 5:
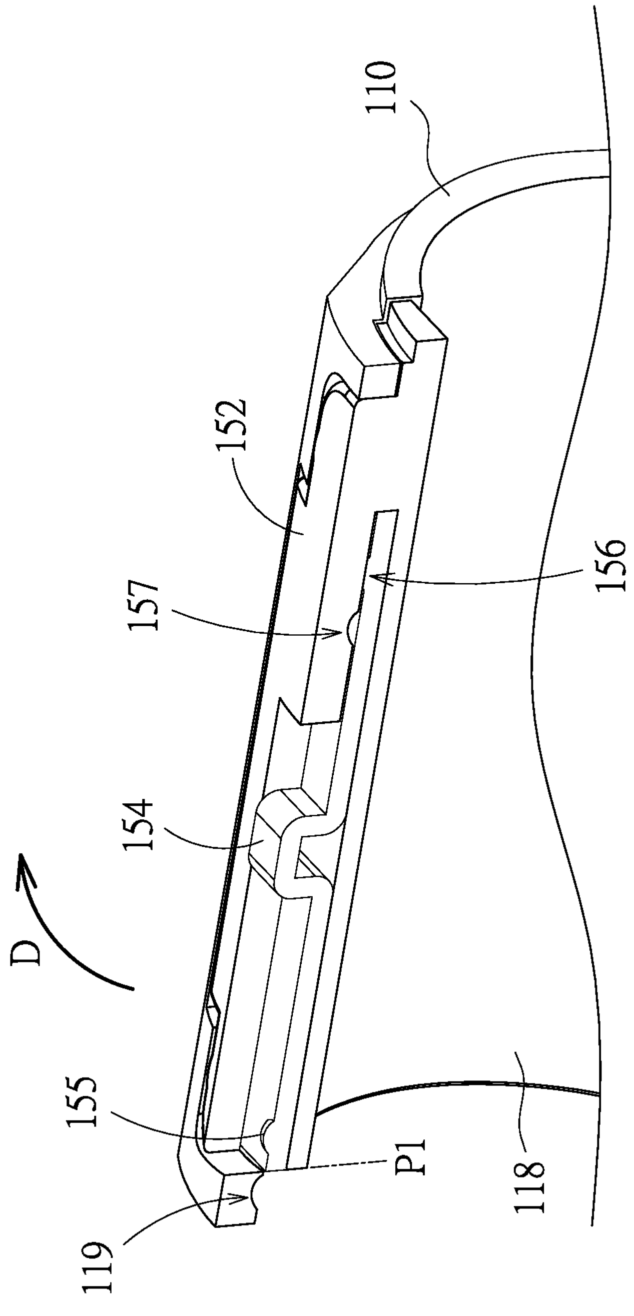
FIG. 5 is a diagram showing a sliding block of the pin cover located at a first predetermined position relative to a cover body of the pin cover of the present invention.
Figure 6:
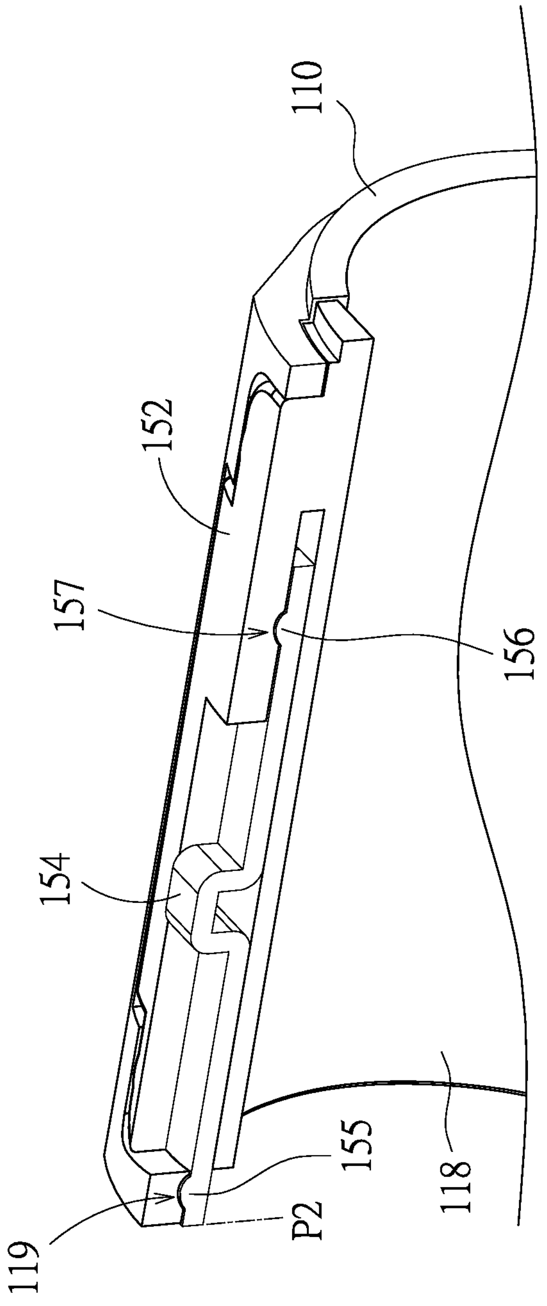
FIG. 6 is a diagram showing the sliding block of the pin cover located at a second predetermined position relative to the cover body of the pin cover of the present invention.

Please refer to FIG. 3 to FIG. 6, and refer to FIG. 2 as well. FIG. 3 is a diagram showing a lock casing, a lock cylinder and a pin cover of the present invention, FIG. 4 is an exploded view of the lock casing and the pin cover of the present invention, FIG. 5 is a diagram showing a sliding block of the pin cover located at a first predetermined position relative to a cover body of the pin cover of the present invention, and FIG. 6 is a diagram showing the sliding block of the pin cover located at a second predetermined position relative to the cover body of the pin cover of the present invention. As shown in figures, the pin cover 150 comprises a cover body 152 and a sliding block 154. The cover body 152 comprises a covering part 152*a* and at least one extension part 152*b*. The covering part 152*a* is formed with a groove 153, and a shape of the covering part 152*a* corresponds to a shape of the pin replacing hole 114 to cover the pin replacing hole 114. The extension part 152*b* is transversally extended from the covering part 152*a* and configured to abut against an edge of the lock casing 110 adjacent to the pin replacing hole 114. In the present embodiment, the cover body 152 comprises two extension parts 152*b* extended from two sides of the covering part 152*a*, but the present invention is not limited thereto. The sliding block 154 is arranged in the groove, and the sliding block 154 is slidable relative to the cover body 152 between a first predetermined position P1 and a second predetermined position P2. The sliding block 154 comprises a main body 154*a* and a protrusion part 154*b* protruded relative to the main body 154*a*. The protrusion part 154*b* allows a user to move the sliding block 154 easily.

When the sliding block 154 is located at the first predetermined position P1 relative to the cover body 152, the sliding block does not extent into inside of the lock casing 110 and does not abut against an inner wall 118 of the lock casing 110 (as shown in FIG. 5). As such, the user can move the pin cover 150 away from the pin replacing hole 114 along a removing direction D. When the sliding block 154 is located at the second predetermined position P2 relative to the cover body 152, the sliding block 154 and the cover body 152 are configured to respectively abut against the inner wall 118 near two opposite ends of the lock casing 110 in order to fix the pin cover 150 in the pin replacing hole 114.

According to the aforementioned arrangement, when the sliding block 154 is located at the first predetermined position P1 relative to the cover body 152, the user can easily move the pin cover 150 away from the pin replacing hole 114; and when the sliding block 154 is located at the second predetermined position P2 relative to the cover body 152, the pin cover 150 can be stably fixed in the pin replacing hole 114 to be hardly detached.

In addition, the sliding block 154 is formed with a first positioning structure 155, and the inner wall 118 of the lock casing 110 is formed with a second positioning structure 119. When the sliding block 154 is located at the second predetermined position P2, the first positioning structure 155 is engaged with the second positioning structure 119 to prevent the sliding block 154 from sliding relative to the cover body 152. Moreover, the sliding block 154 is further formed with a third positioning structure 156, and the cover body 152 is formed with a fourth positioning structure 157. When the sliding block 154 is located at the second predetermined position P2, the third positioning structure 156 is engaged with the fourth positioning structure 157 to prevent the sliding block 154 from sliding relative to the cover body 152. According to the aforementioned arrangement, the design of the first positioning structure 155, the second positioning structure 119, the third positioning structure 156 and the fourth positioning structure 157 can increase stability of fixing the pin cover 150 in the pin replacing hole 114 when the sliding block 154 is located at the second predetermined position P2.

In the present embodiment, the first positioning structure 155 and the third positioning structure 156 are protruded structures, and the second positioning structure 119 and the fourth positioning structure 157 are recessed structures, but the present invention is not limited thereto.

Furthermore, a top surface of the protrusion part 154*b* of the sliding block 154, a top surface of the cover body 152 and an outer surface of the lock casing 110 are flush, such that the lock casing can be easily mounted into the outer casing 140. In the present embodiment, the cover body 152 is made of a plastic material or other elastic material, and the sliding block 154 is made of a metal material, but the present invention is not limited thereto. When the cover body 152 is made of the plastic material or other elastic material, the cover body 152 allows the pin cover 150 to be easily mounted into the pin replacing hole 114 or removed from the pin replacing hole 114 through elastic deformation. Moreover, the sliding block 154 made of the metal material can fit better to the cover body 152 through material properties without shacking relative to each other.

More particularly, the edges of the lock casing 110 at two sides of the pin replacing hole 114 are in a shape corresponding to the extension parts 152*b*, and the covering part 152*a* and the extension parts 152*b* form a corresponding stepped shape. As such, when the pin cover 150 covers the pin replacing hole 114, the pin cover 150 is prevented from falling into the lock cylinder hole 112 through the pin replacing hole 114. In other words, the pin cover 150 is prevented from moving downward as shown in FIG. 6. When the sliding block 154 is located at the second predetermined position P2 relative to the cover body 152, the first positioning structure 155 of the sliding block 154 is configured to engage with the second positioning structure 119 of the inner wall 118 of the lock casing 110, so as to prevent the pin cover 150 from moving upward as shown in FIG. 6. As such, the aforementioned arrangement can provide better fixing effects to prevent the pin cover 150 from moving downward and upward when the sliding block 154 is located at the second predetermined position P2 relative to the cover body 152.

Please refer to FIG. 3, and refer to FIG. 2 as well. When the lock cylinder 120 is located at a first rotation position R1 relative to the lock casing 110 (when a top portion 124*a* of the key hole 124 points to the first rotation position R1) and when the key hole 124 is not inserted with a key, the plurality of second pin holes 122 are communicated with the plurality of first pin holes 116 respectively, and the springs are configured to push the first pins 132 toward the lock cylinder 120, such that portions of the first pins 132 extend into the second pin holes 122. As such, the lock cylinder 120 is not able to rotate relative to the lock casing 110. When the lock cylinder 120 is located at the first rotation position R1 relative to the lock casing 110 and when the key hole 124 is inserted with a correct key, heights of teeth of the key correspond to the lengths of the second pins 134, such that the first pins no longer extend into the second pin holes 122, so as to allow the lock cylinder 120 to rotate relative to the lock casing 110 from the first rotation position R1. The aforementioned arrangement is well known to those skilled in the art, therefore, no further illustration is provided.

When the lock cylinder 120 is rotated relative to the lock casing 110 from the first rotation position R1 to a second rotation position R2 (when the top portion 124*a* of the key hole 124 points to the second rotation position R2), the plurality of second pin holes 122 are communicated with the pin replacing hole 114. When the user needs to change the key, the user can remove the pin cover 150 from the lock casing 110 to expose the pin replacing hole 114. As such, the user can take out the second pins 134 through the pin replacing hole 114. The user can further insert a new key into the key hole 124, replace new second pins with lengths corresponding to heights of teeth of the new key, and mount the pin cover 150 into the pin replacing hole 114 of the lock casing 110 again. Thereafter, the user can use the new key to rotate the lock cylinder 120 the second rotation position R2 to the first rotation position R1, and then removes the new key, in order to complete the operation of replacing key.

Figure 7:
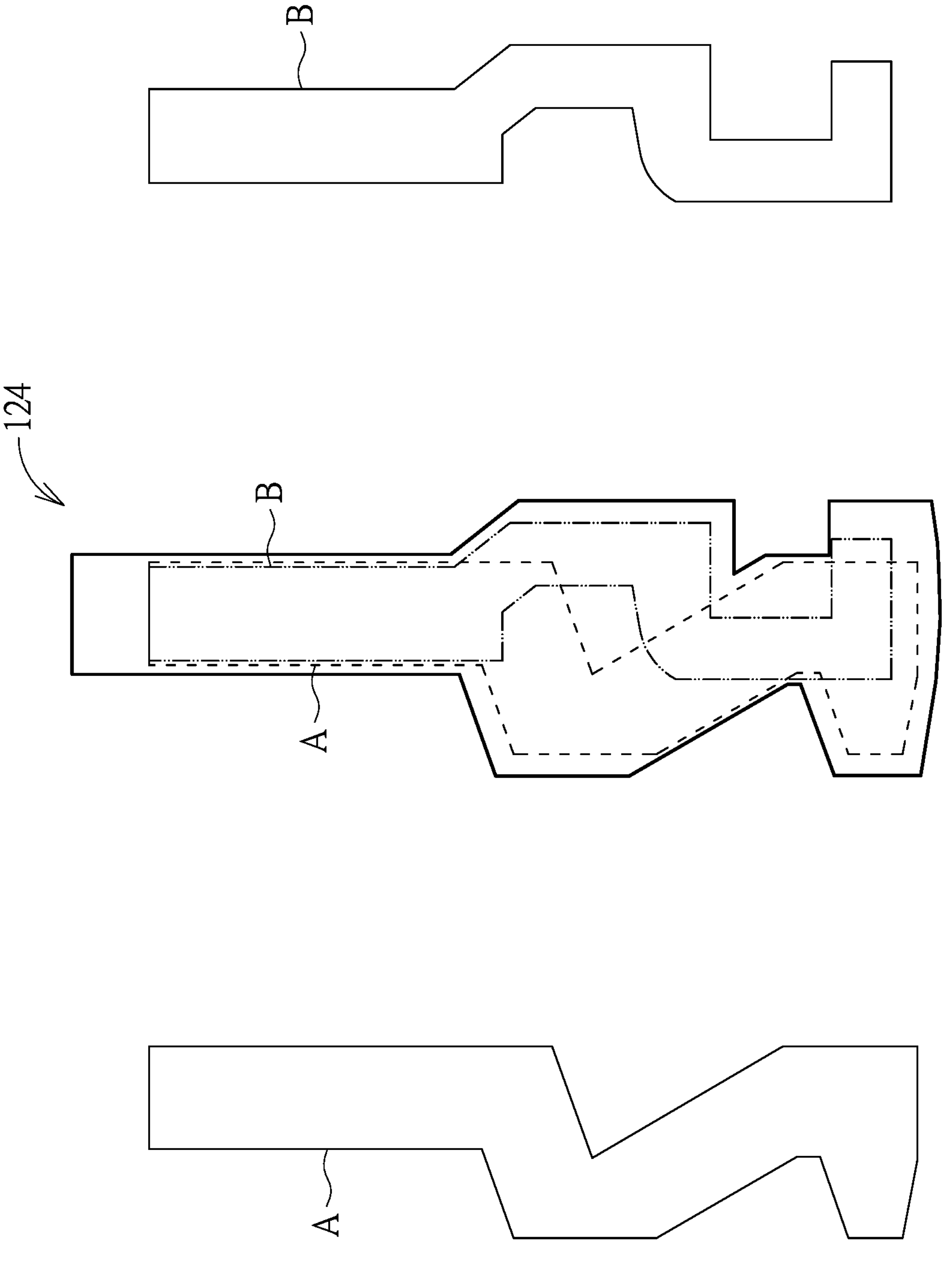
FIG. 7 is a diagram showing an outer contour of a keyhole of the lock cylinder the present invention.

Please refer to FIG. 7. FIG. 7 is a diagram showing an outer contour of a keyhole of the lock cylinder the present invention. As shown in the figure, the lock cylinder 120 of the rekeyable lock 100 of the present invention is applicable to a first key having a first cross section A and a second key having a second cross section B, and the first cross section A is different from the second cross section B. For example, an outer contour of the keyhole 124 is greater than or equal to an outer contour after superimposing the first cross section A and the second cross section B. Therefore, the key hole 124 is configured to selectively receive the first key with the first cross section A or the second key with the second cross section B. In FIG. 7, shapes of the first cross section A and the second cross section B are just examples, the present invention is not limited thereto. The shapes of the first cross section A and the second cross section B can be changed according to use and design requirements.

According to the aforementioned arrangement, the lock cylinder 120 of the rekeyable lock 100 of the present invention is not only applicable to keys with different heights of teeth, but also applicable to keys with different cross sections, so as to increase flexibility of the rekeyable lock 100 of the present invention in use and design.

In addition, the rekeyable lock 100 of the present invention further comprises a transmission rod 160 connected to the lock cylinder 120 for rotating along with the lock cylinder 120. The transmission rod 160 is configured to drive a latch to move (such as driving the latch to retract relative to a door panel) when being rotated.

In contrast to the prior art, the pin cover 150 of the rekeyable lock 100 of the present invention can be stably fixed in the pin replacing hole 114 in order to prevent the second pins 134 from falling out. Moreover, the pin cover 150 of the rekeyable lock 100 of the present invention can be easily removed from the pin replacing hole 114 in order to change the second pins 134. In addition, the lock cylinder 120 of the rekeyable lock 100 of the present invention is applicable to keys with different heights of teeth and keys with different cross sections, so as to increase flexibility of the rekeyable lock 100 of the present invention in use and design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rekeyable lock, comprising:

a lock casing formed with a lock cylinder hole, a pin replacing hole and a plurality of first pin holes;

a lock cylinder rotatably arranged in the lock cylinder hole, wherein the lock cylinder is formed with a plurality of second pin holes;

a pin set, comprising:

a plurality of first pins respectively accommodated in the first pin holes; and a plurality of second pins respectively accommodated in the second pin holes; and a pin cover arranged in the pin replacing hole, the pin cover comprising:

a cover body formed with a groove; and a sliding block arranged in the groove and slidable relative to the cover body between a first predetermined position and a second predetermined position;

wherein when the sliding block is located at the second predetermined position, the sliding block and the cover body are configured to respectively abut against an inner wall of the lock casing to fix the pin cover in the pin replacing hole;

wherein the pin cover is configured to cover the whole pin replacing hole when the plurality of second pin holes are communicated with the pin replacing hole;

wherein the pin cover is not rotatable relative to the lock casing when the lock cylinder is rotated relative to the lock casing.

2. The rekeyable lock of claim 1, wherein when the sliding block is located at the first predetermined position, the sliding block does not abut against the inner wall of the lock casing to allow the pin cover to move away from the pin replacing hole.

3. The rekeyable lock of claim 1, wherein the sliding block is formed with a first positioning structure, and the inner wall of the lock casing is formed with a second positioning structure; wherein when the sliding block is located at the second predetermined position, the first positioning structure is engaged with the second positioning structure to prevent the sliding block from sliding relative to the cover body.

4. The rekeyable lock of claim 3, wherein the sliding block is further formed with a third positioning structure, and the cover body is formed with a fourth positioning structure; wherein when the sliding block is located at the second predetermined position, the third positioning structure is engaged with the fourth positioning structure to prevent the sliding block from sliding relative to the cover body.

5. The rekeyable lock of claim 1, wherein the sliding block comprises a main body and a protrusion part protruded relative to the main body; wherein a top surface of the protrusion part, a top surface of the cover body and an outer surface of the lock casing are flush.

6. The rekeyable lock of claim 1, wherein when the lock cylinder is located at a first rotation position relative to the lock casing, the plurality of second pin holes are communicated with the plurality of first pin holes respectively; wherein when the lock cylinder is located at a second rotation position relative to the lock casing, the plurality of second pin holes are communicated with the pin replacing hole.

7. The rekeyable lock of claim 1, wherein the cover body comprises:

a covering part configured to cover the pin replacing hole, wherein the covering part is formed with the groove; and an extension part extended from the covering part and configured to abut against an edge of the lock casing adjacent to the pin replacing hole.

8. The rekeyable lock of claim 1, wherein the cover body is made of a plastic material, and the sliding block is made of a metal material.

9. The rekeyable lock of claim 1, wherein the lock cylinder is further formed with a key hole communicated with the plurality of second pin holes; wherein the lock cylinder is applicable to a first key having a first cross section and a second key having a second cross section different from the first cross section, and the key hole is configured to selectively receive the first key or the second key, wherein an outer contour of the key hole is defined by intersection of the lock cylinder with a predetermined plane adjacent to the key hole, and the predetermined plane is perpendicular to an rotational axis of the lock cylinder relative to the lock casing, wherein the first cross section is defined by intersection of the first key with the predetermined plane, and the second cross section is defined by intersection of the second key with the predetermined plane.

10. The rekeyable lock of claim 9, wherein the outer contour of the key hole is greater than or equal to an outer contour after superimposing the first cross section and the second cross section.

* * * * *